United States Patent
Kim et al.

(10) Patent No.: US 9,887,755 B2
(45) Date of Patent: Feb. 6, 2018

(54) APPARATUS, SYSTEM AND METHOD OF BEAM TRACKING

(71) Applicant: INTEL IP CORPORATION, Santa Clara, CA (US)

(72) Inventors: Joongheon Kim, San Jose, CA (US); Hwan-Joon Kwon, Santa Clara, CA (US); Carlos Cordeiro, Portland, OR (US); Ali S. Sadri, San Diego, CA (US)

(73) Assignee: INTEL IP CORPORATION, Santa Clara, CA (US)

(*) Notice: Subject to any disclaimer, the term of this patent is extended or adjusted under 35 U.S.C. 154(b) by 240 days.

(21) Appl. No.: 14/469,818

(22) Filed: Aug. 27, 2014

(65) Prior Publication Data

US 2016/0065286 A1 Mar. 3, 2016

(51) Int. Cl.
*H04J 4/00* (2006.01)
*H04B 7/06* (2006.01)

(52) U.S. Cl.
CPC ......... *H04B 7/0617* (2013.01); *H04B 7/0619* (2013.01); *H04J 4/00* (2013.01)

(58) Field of Classification Search
CPC .. H04B 7/0617; H04B 7/0639; H04B 7/0469; H04B 7/0695; H04B 7/088
See application file for complete search history.

(56) References Cited

U.S. PATENT DOCUMENTS

| | | | |
|---|---|---|---|
| 2009/0232240 A1* | 9/2009 | Lakkis | H04B 7/0491 375/260 |
| 2012/0087400 A1* | 4/2012 | Kim | H04B 7/043 375/219 |
| 2014/0071838 A1* | 3/2014 | Jia | H04B 7/04 370/252 |
| 2016/0021548 A1* | 1/2016 | Raghavan | H04W 16/28 370/329 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wireless Gigabit Alliance (WGA) Specifications; WiGig MAC and PHY Specification Version 1.1, Apr. 2011—Final Specification; 442 pages.

* cited by examiner

*Primary Examiner* — Romani Ohri
(74) *Attorney, Agent, or Firm* — Shichrur & Co.

(57) ABSTRACT

Some demonstrative embodiments include apparatuses, devices, systems and methods of beam tracking For example, an apparatus may include a transmitter to transmit data to a wireless communication device via a first beam direction of a plurality of beam directions, and to transmit one or more pilot signals via one or more other beam directions of the plurality of beam directions; and a receiver (Continued)

to receive from the wireless communication device a feedback indicating a second beam direction of the plurality of beam directions, the second beam direction being one of the one or more other beam directions, wherein the transmitter is to switch to the second beam direction to communicate with the wireless communication device.

25 Claims, 7 Drawing Sheets

US 9,887,755 B2

APPARATUS, SYSTEM AND METHOD OF BEAM TRACKING

TECHNICAL FIELD

Embodiments described herein generally relate to beam tracking

BACKGROUND

A wireless communications network in a millimeter-wave band may provide high-speed data access for users of wireless communication devices.

A beam training procedure may be configured to steer a first directional antenna of a first wireless communication device, e.g., a beamforming initiator (BI), and a second directional antenna of a second wireless communication device, e.g., a beamforming responder (BR). The beam training procedure may be performed, for example, to establish a high throughout communication link between the BI and the BR at an acceptable communication range between the BR and the BI.

The first and/or the second directional antennas may use high-gain narrow beams. Each of the first and second directional antennas may be able to steer the beams in a large number of different directions. As a result, targeting the beams of the first and second antennas to establish the high throughout communication link may be relatively difficult.

Conventional beam training procedures for the millimeterWave (mmWave) Band require testing each pair of beam configurations, e.g., including a beam direction of each of the first and second antennas.

Accordingly, the beam training procedure may take a long period of time and may require testing a large number of beam settings.

Tracking the movement of the first device and/or the second device, for example, to maintain the high throughout communication link may require repeating the beam training procedure.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
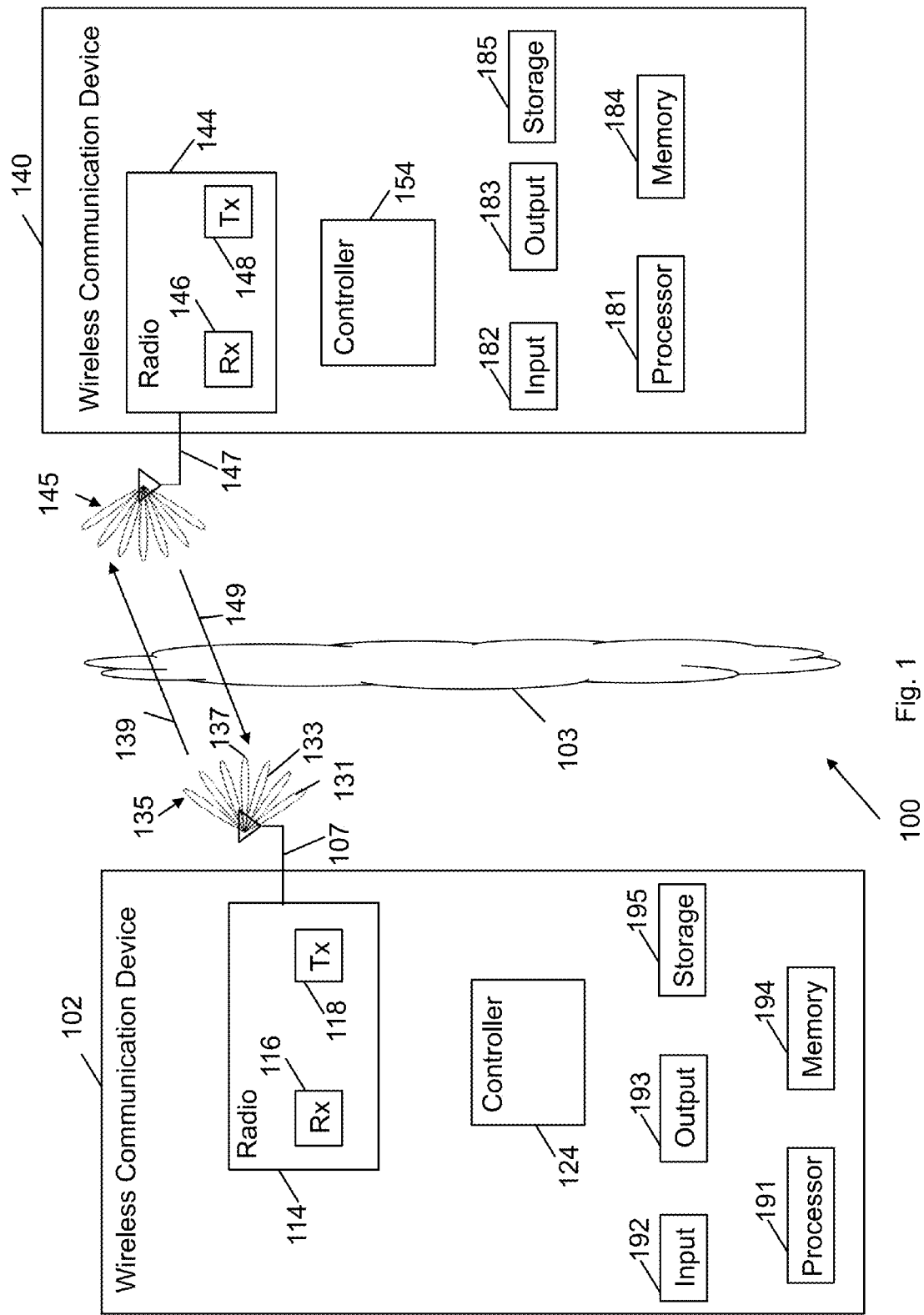
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "access point" (AP), as used herein, may include an entity that contains one station (STA) and provides access to distribution services, via the WM for associated STAs.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, system 100 may include a beamforming initiator (BI) and a beamforming responder (BR) to perform a beamforming training session between the BI and the BR. For example, wireless communication device 102 may perform the functionality of the BI, and/or wireless communication device 140 may perform the functionality of the BR.

In other embodiments, wireless communication device 140 may perform the functionality of the BI, and/or wireless communication device 102 may perform the functionality of the BR.

In some demonstrative embodiments, at least one device of devices 102 and 140 may include a mobile device.

In one example, device 102 may include a mobile device, and device 140 may include a non-mobile device. In another example, device 140 may include a mobile device, and device 102 may include a non-mobile device. In another example, both devices 102 and 140 may include mobile devices.

In some demonstrative embodiments, devices 102 and/or 140 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components.

In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments WM 103 may include any other directional channel.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145.

In some demonstrative embodiments, a beam direction of an antenna may be expressed by a direction and a beam width, e.g., an angle, of a beam transmitted by the antenna.

In one example, a beam direction may be directed to the north and may have a beam width of 30 degrees.

In some demonstrative embodiments, the plurality of beam directions 135 and/or 145 may include relatively narrow beams, e.g., beams having a beam width between 1-10 degrees.

In some demonstrative embodiments, the plurality of beam directions 135 and/or 145 may include mmWave beam directions.

In some demonstrative embodiments, a number of the plurality of beam directions 135 and/or 145 may be relatively large, for example, if the plurality of beam directions 135 and/or 145 includes relatively narrow beams.

In one example, the plurality of beam directions 135 and/or 145 may include 360 beam directions, for example, if a beam width of a beam direction of the plurality of beam directions 135 and/or 145 is one degree.

In some demonstrative embodiments, devices 102 and/or 140 may perform a beamforming training session to select a pair of beam directions including a first beam direction of the plurality of beam directions 135 and a second beam direction of the plurality of beam directions 145 to communicate between devices 102 and 140 via a mmWave wireless communication link.

In some demonstrative embodiments, devices 102 and/or 140 may require a relatively long period of time to select the pair of beam directions to communicate between devices 102 and 140.

In one example, device 102 and/or 140 may evaluate 360 beam directions and device 140 may evaluate 360 beam directions, e.g., a total of 720 evaluations, for example, if a beamwidth of each beam direction of the plurality of beam directions 135 and/or 145 is one degree, and devices 102 and/or 140 evaluate all possible combinations of pairs in a two dimensional (2D) plane, e.g., only in the horizontal plane.

In another example, device 102 and/or 140 may perform 259200 evaluations, for example, if device 102 and/or 140 evaluate all possible combinations of pairs in a three dimensional (3D) plane, e.g., 360 beam directions in the horizontal plane, and 360 beam direction in the vertical plane.

In some demonstrative embodiments, device 102 and/or device 140 may utilize a beam tracking mechanism to adjust and/or track a beam direction of the plurality of beam directions 135 and/or 145, e.g., as described below.

For example, device 102 may track and/or adjust the beam direction of antenna 107, and/or device 140 may track and/or adjust the beam direction of antenna 147, for example, if a position of device 140 and or a position of device 102 change, e.g., after performing the beamforming training session.

The term "position" as used herein with reference to a device may include a location, a rotation, and/or an orientation of the device. For example, a change in the position of device 102 may include a change of an orientation, a movement, a rotation, and/or a displacement of device 102.

In some demonstrative embodiments, devices 102 and/or 140 may track the beam direction of devices 102 and/or 140, for example, to maintain a quality of a wireless communication link between devices 102 and 140 and/or to prevent disconnection of communication between devices 102 and/or 140.

In one example, the quality of the wireless communication link may be reduced and/or the wireless communication link may be disconnected, for example, if devices 102 and/or 140 do not track the beam direction of devices 102 and/or 140, e.g., to account for changes in the position of at least one of devices 102 and/or 140.

In some demonstrative embodiments, performing one or more additional beamforming training sessions to track the beam direction may require a relatively long period of time and/or may effect communication between devices 102 and 140, e.g., may reduce a data rate between device 102 and 140.

In one example, device 102 and/or device 140 may perform the one or more additional beamforming training sessions to track the beam direction of devices 102 and/or 140, for example, responsive to a relatively large, often and/or quick change in the position of at least one of devices 102 and/or 140.

In some demonstrative embodiments, devices 102 and/or 140 may be configured to track the beam direction of device 102 and/or 140 ("beam tracking"), for example, prior to, or even to avoid, performing an additional beamforming training session, e.g., as described below.

Some demonstrative embodiments may enable to track the beam direction of devices 102 and/or 140 at a reduced time, e.g., as described below.

Some demonstrative embodiments may enable to track the beam direction of devices 102 and/or 140, for example, while maintaining a relatively increased data rate between devices 102 and 140, e.g., as described below.

In some demonstrative embodiments, devices 102 and/or 140 may include a controller to control tracking of the beam direction of devices 102 and/or 140. For example, device 102 may include a controller 124, and/or device 140 may include a controller 154.

In some demonstrative embodiments, controller 154 may be configured to perform the functionality of controller 124 and vice versa.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of the controller may be implemented by logic, which may be executed by a machine and/or one or more processors, e.g., as described below.

In some demonstrative embodiments, devices 102 and/or 140 may perform a first beamforming training session to determine a first beam direction of the plurality of beam directions 135 to communicate between devices 102 and 140 over the wireless communication link.

In some demonstrative embodiments, controller 124 may determine a beam direction 133 ("the Tx beam direction") of the plurality of beam directions 135 to communicate with device 140, for example, based on the first beamforming training session.

In some demonstrative embodiments, device 102 and 140 may communicate data frames via beam direction 133.

In some demonstrative embodiments, transmitter 118 may transmit the data frames to device 140 via beam direction 133 over the wireless communication link.

In some demonstrative embodiments, receiver 146 may receive at least one data frame of the data frames from beam direction 133 of device 102.

In some demonstrative embodiments, controller 124 may be configured to select one or more other beam directions of beam directions 135, e.g., directions other than beam direction 133, e.g., as described below.

In other embodiments, the one or more other beam directions may be selected by any other logic and/or entity, e.g., controller 154, a user of device 102 and/or the like.

In some demonstrative embodiments, controller 124 may select the one or more other beam directions based on beam direction 133, e.g., as described below.

In other embodiments, controller 124 may select the one or more other beam directions based on any other parameter and/or criteria.

In some demonstrative embodiments, the one or more other beam directions may include one or more beam directions adjacent to beam direction 133, e.g., as described below with reference to FIGS. 2A-2E.

In some demonstrative embodiments, the one or more other beam directions may surround beam direction 133, e.g., as described below with reference to FIGS. 2A-2C.

In some demonstrative embodiments, the one or more other beam directions may include a two-dimensional array of beam directions, e.g., as described below with reference to FIGS. 2A-2C.

In some demonstrative embodiments, the one or more other beam directions may include two or more beam directions on a straight line through beam direction 133, e.g., as described below with reference to FIGS. 2D and 2E.

In some demonstrative embodiments, controller 124 may select the one or more other beam directions, based on a change in the position of device 140 and/or device 102, e.g., based on one or more directions of movement of device 102 and/or device 140.

In one example, the one or more other beam directions may include the two-dimensional array of beam directions, for example, if at least one of devices 102 and 140 is to move in two or more directions, e.g., a vertical direction and a horizontal direction, and/or if at least one of devices 102 and 140 is to be rotated in one or more directions.

In another example, the one or more other beam directions may include two or more beam directions on a straight line, for example, if at least one of devices 102 and 140 is to move in one direction, e.g., along a straight line.

In other embodiments, the one or more other beam directions may include beam direction of any other arrangement and/or scheme, e.g., different from the schemes described below with reference to FIG. 2A-2E.

Reference is made to FIGS. 2A-2E, which schematically illustrate a plurality of beam directions 200, a current beam direction 233, and one or more other beam directions 240, in accordance with some demonstrative embodiments. For example, the plurality of beam directions 200 may perform the functionality of the plurality of beam directions 135 (FIG. 1), current beam direction 233 may perform the functionality of beam direction 133 (FIG. 1), and/or the one or more other beam direction 240 may be selected by controller 124 (FIG. 1).

In some demonstrative embodiments, current beam direction 233 may correspond to a current beam direction between devices 102 and 140 (FIG. 1), and/or the one or more other beam directions 240 may correspond to one or more expected changes in the positions of device 140 (FIG. 1) and/or device 102, e.g., based on an expected change in a relative position between devices 102 and 140. The relative position between devices 102 and 140 (FIG. 1) may change, for example, if the position of at least one of devices 102 and 104 (FIG. 1) changes, e.g., such that current beam direction 233 may no longer be directed to device 140 (FIG. 1).

Figure 2A:
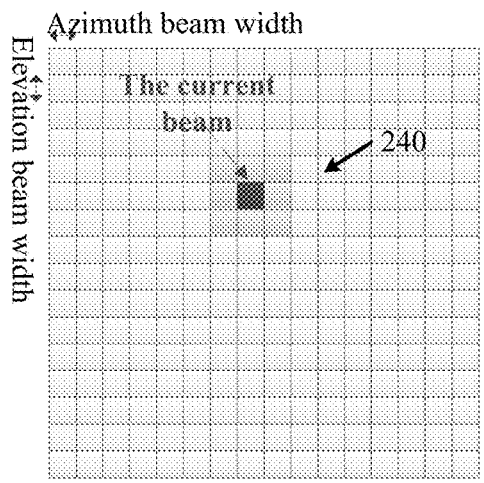
FIGS. 2A-2E are schematic illustrations of a plurality of different beam direction schemes corresponding to a current beam direction, in accordance with some demonstrative embodiments.
Figure 2B:
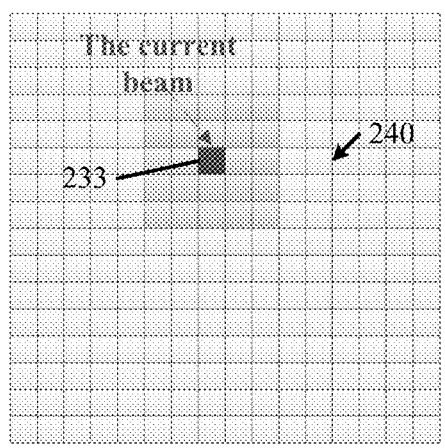
Figure 2C:
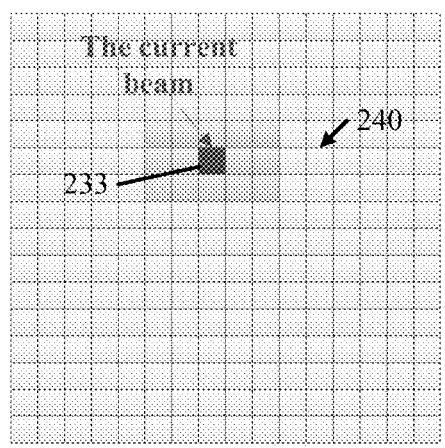

As shown in FIGS. 2A-2C, the one or more other beam directions 240 may surround current beam direction 233, and/or may include a two-dimensional array of beam directions.

In one example, controller 124 (FIG. 1) may select the other beam directions 240 of FIG. 2A, for example, if the relative position of devices 102 and 140 (FIG. 1) is expected to change in a plurality of directions at a first magnitude.

In another example, controller 124 (FIG. 1) may select the other beam directions 240 of FIG. 2B, for example, if the relative position of devices 102 and 140 (FIG. 1) is expected to change in a plurality of directions at a second magnitude, e.g., greater than the first magnitude.

In another example, controller 124 (FIG. 1) may select the other beam directions 240 of FIG. 2C, for example, if the relative position of devices 102 and 140 (FIG. 1) is expected to change in a first direction, e.g., a horizontal direction, at a first magnitude, and in second direction, e.g. a vertical direction at a second magnitude, e.g., lesser than the first magnitude.

Figure 2D:
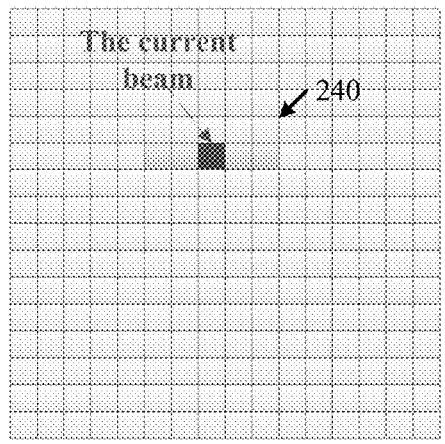
Figure 2E:
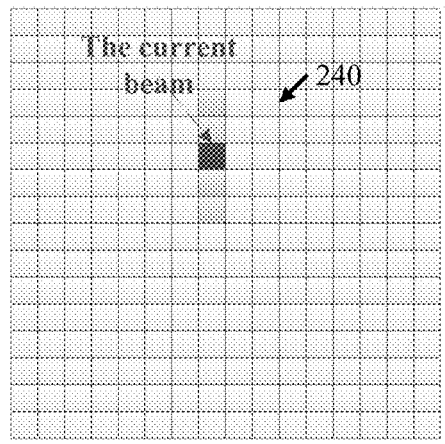

As shown in FIGS. 2D and 2E, the one or more other beam directions 240 may include two or more beam directions on a straight line through beam direction 233.

In one example, controller 124 (FIG. 1) may select the other beam directions 240 of FIG. 2D, for example, if devices 102 and/or 140 (FIG. 1) are expected to move along the horizontal direction.

In another example, controller 124 (FIG. 1) may select the other beam directions 240 of FIG. 2E, for example, if devices 102 and/or 140 (FIG. 1) are expected to move along a straight line in the vertical direction.

In some demonstrative embodiments, controller 124 (FIG. 1) may select any other beam directions of the plurality of beam directions 200, e.g., based on expected changes in the positions of devices 102 and/or 140 (FIG. 1), based on movements of devices 102 and/or 140 (FIG. 1), based on changes in the orientations of devices 102 and/or 140 (FIG. 1), based on link quality, and/or based on any other parameter and/or criterion.

Referring back to FIG. 1, in some demonstrative embodiments, transmitter 118 may transmit one or more pilot signals via the one or more other beam directions of the plurality of beam directions 135. For example, transmitter 118 may transmit the one or more pilot signals, e.g., after controller 124 selects the one or more other beam directions.

In some demonstrative embodiments, the one or more pilot signals may include reference signals, sounding signals, beacon signals, and/or any other signals configured to be received by device 140.

In one example, the one or more pilot signals may include PHY level signals, for example, without including any MAC related features and/or attributes.

In some demonstrative embodiments, transmitter 118 may periodically repeat the transmission of the one or more pilot signals.

In some demonstrative embodiments, the one or more pilot signals may include a plurality of pilot signals.

In some demonstrative embodiments, transmitter 118 may transmit the plurality of pilot signals according to a time division multiplexing (TDM) scheme.

In some demonstrative embodiments, transmitter 118 may transmit the plurality of pilot signals with a plurality of data frames. For example, each pilot signal of the plurality of pilot signals may be transmitted with a respective data frame of the plurality of the data frames, for example, if transmitter 118 transmits the plurality of pilot signals according to the TDM scheme.

In some demonstrative embodiments, a timing of a pilot signal may indicate a beam direction used to transmit the pilot signal. For example, if the plurality of other beam directions include eight beam direction, a first pilot may be transmitted via a first beam direction at a first time slot corresponding to a first frame, a second pilot may be transmitted via a second beam direction at a second time slot corresponding to a second frame, a third pilot may be transmitted via a third beam direction at a third time slot corresponding to a third frame, a fourth pilot may be transmitted via a fourth beam direction at a fourth time slot corresponding to a fourth frame, a fifth pilot may be transmitted via a fifth beam direction at a fifth time slot corresponding to a fifth frame, a sixth pilot may be transmitted via a sixth beam direction at a sixth time slot corresponding to a sixth frame, a seventh pilot may be transmitted via a seventh beam direction at a seventh time slot corresponding to a seventh frame, and an eighth pilot may be transmitted via an eighth beam direction at an eighth time slot corresponding to an eighth frame.

In some demonstrative embodiments, transmitter 118 may transmit the plurality of pilot signals according to a frequency division multiplexing (FDM) scheme.

In some demonstrative embodiments, transmitter 118 may simultaneously transmit the plurality of pilot signals over a plurality of different subcarriers. For example, each pilot signal of the plurality of pilot signals may be transmitted via respective subcarrier of the plurality of the different subcarriers, for example, if transmitter 118 transmits the plurality of pilot signals according to the FDM scheme.

In some demonstrative embodiments, controller 124 may communicate with controller 154 a message 139 including an indication of the one or more other beam directions, e.g., after selecting the one or more other beam directions. In one example, message 139 may assign a different indicator value to each of the one or more other beam directions, e.g., as described below with reference to FIG. 3.

In some demonstrative embodiments, transmitter 118 may transmit the message 139 to device 140.

In some demonstrative embodiments, receiver 146 may receive the message 139 from device 102.

In some demonstrative embodiments, receiver 146 may receive a pilot signal of the one or more pilot signals transmitted from device 102.

In one example, receiver 146 may receive the pilot signal, for example, if the position of at least one of devices 102 and 140 changes.

In some demonstrative embodiments, receipt of the pilot signal at device 140 may indicate a change from the current beam direction to a second beam direction of the plurality of beam directions 135, for example, the beam direction via which the pilot signal is transmitted.

In some demonstrative embodiments, controller 154 may determine a beam direction corresponding to a received pilot signal based on one or more attributes and/or characteristics of the one or more pilot signals transmitted from device 102.

In one example, controller 154 may determine the beam direction corresponding to the received pilot signal based on a timing of the pilot signal, for example, if the plurality of pilot signals is transmitted according to the TDM scheme, e.g., as described above.

For example, controller 154 may determine that the received pilot signal includes the first pilot signal transmitted via the first beam direction, e.g., if the pilot signal is received with the first data frame, or that the received pilot signal includes the fourth pilot signal transmitted via the fourth beam direction, e.g., if the pilot signal is received with the fourth data frame.

In another example, controller 154 may determine the beam direction corresponding to the received pilot signal based on a frequency subcarrier over which the pilot signal is received, e.g., if the plurality of pilot signals is transmitted according to the FDM scheme.

For example, message 139 may indicate an association between each subcarrier of the plurality of different subcarriers and a respective pilot signal of the plurality of pilot signals. According to this example, a first pilot signal may be transmitted in a first beam direction on a first subcarrier of the plurality of different subcarriers, and/or fourth pilot signal may be transmitted in a fourth beam direction on a fourth subcarrier of the plurality of different subcarriers.

In another example, the pilot signal may include any indication of the beam direction. For example, the pilot signal may include an index and/or an identity of the beam direction in which the pilot signal is transmitted.

In another example, the pilot signal may indicate the beam direction based on any other association, method, and/or indication.

In some demonstrative embodiments, receiver 146 may receive the pilot signal indicative of a beam direction of the plurality of beam directions 135, for example, if transmitter 118 transmitted the pilot signal via the beam direction.

In one example, receiver 146 may receive the pilot signal indicative of a beam direction 137 of the plurality of beam directions 135, for example, if transmitter 118 transmitted the pilot signal via beam direction 137.

In some demonstrative embodiments, transmitter 148 may transmit to device 120 a feedback 149 indicative of the beam direction corresponding to the received pilot signal, e.g., the beam direction 137.

In some demonstrative embodiments, receiver 116 may receive from device 140 the feedback 149 indicative of beam direction 137.

In some demonstrative embodiments, transmitter 118 may switch to beam direction 137 to communicate with device 140.

In some demonstrative embodiments, transmitter 118 may transmit the data frames in beam direction 137.

In some demonstrative embodiments, receiver 146 may receive from device 102 another data frame from beam direction 137, for example, subsequent to transmission of feedback 149.

In one example, transmitter 118 may transmit the one or more pilot signals in the one or more beam directions 240 of FIG. 2A.

In some demonstrative embodiments, feedback 149 may include a three-bit value indicative of the beam direction 137, e.g., if the plurality of beam directions include up to eight beam directions.

Figure 3:
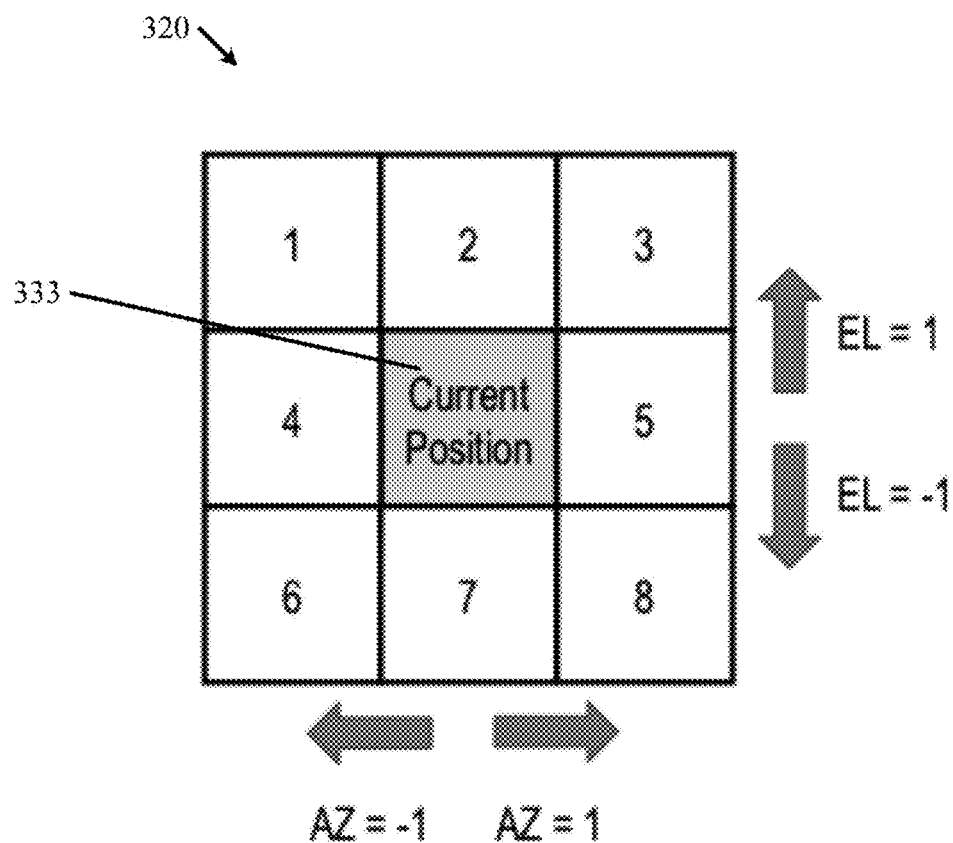
FIG. 3 is a schematic illustration of a scheme of a plurality of beam directions surrounding a current beam direction, in accordance with some demonstrative embodiments.

Reference is made to FIG. 3, which schematically illustrates a scheme of a plurality beam directions 320 surrounding a current beam direction 333, in accordance with some demonstrative embodiments. For example, the plurality of beam directions 320 may perform the functionality of the plurality of beam directions of FIG. 2A, and/or current beam direction 333 may perform the functionality of current beam direction 233 (FIG. 2).

In some demonstrative embodiments, transmitter 118 (FIG. 1) may transmit data in current beam direction 333, which may be directed towards a current position of device 140 (FIG. 1).

In some demonstrative embodiments, transmitter 118 (FIG. 1) may transmit a plurality of pilot signals in the plurality of beam directions 320, which may surround current beam direction 333.

As shown in FIG. 3, the plurality of pilot signals may include 8 pilot signals, denoted 1-8.

As shown in FIG. 3, each pilot signal of the plurality of pilot signals may be transmitted in a respective beam direction of the plurality of beam directions 320. For example, pilot signal 8 may be transmitted in beam direction 137 (FIG. 1).

As shown in FIG. 3, the plurality of beam directions 320 may be identified using a three-bit value, e.g., representing the numbers between 1 and 8.

In one example, receiver 146 (FIG. 1) may receive pilot signal 8, for example, if a change in a position of devices 102 and/or 140 (FIG. 1) results in beam direction 137 (FIG. 1) being directed to device 140 (FIG. 1).

According to this example, controller 154 (FIG. 1) may identify pilot signal 8 being transmitted via beam direction 137 (FIG. 1), e.g., as described above.

In some demonstrative embodiments, transmitter 148 (FIG. 1) may transmit feedback 149 (FIG. 1) indicative of pilot signal 8.

In one example, feedback 149 (FIG. 1) may include an identification of pilot signal 8, e.g., a three-bit identification including the number 8.

In some demonstrative embodiments, the tree-bit identification may indicate an elevation offset and an azimuth offset of the beam direction of the received pilot signal, e.g., with respect to beam direction 133 (FIG. 1).

In one example, as shown in FIG. 3, feedback 149 (FIG. 1) may include the three bit indication including the number 8, e.g., "111", to indicate an elevation offset of "−1" and an azimuth offset of "+1", for example, if device 140 (FIG. 1) receives pilot signal 8.

In another example, as shown in FIG. 3, feedback 149 (FIG. 1) may include the three bit indication including the number 4 to indicate an elevation offset of "0" and an azimuth offset of "−1", for example, if device 140 (FIG. 1) receives pilot signal 4.

In other embodiments, any other indication and/or value may be used to indicate pilot signal 8 and/or beam direction 137 (FIG. 1).

Referring back to FIG. 1, in some demonstrative embodiments device 102 may switch from beam direction 133 to beam direction 137, for example, upon receiving feedback 149 including the indication of pilot signal 8 (FIG. 3).

In some demonstrative embodiments, controller 124 may update the one or more other beam directions to include one or more updated beam directions.

In one example, controller 124 may update the one or more other beam directions 240 of FIG. 2A to the one or more other beam directions 240 of FIG. 2B, for example, responsive to an increase in a magnitude of change in the relative position between devices 102 and 140.

In another example, controller 124 may update the one or more other beam directions 240 of FIG. 2D to the one or more other beam directions 240 of FIG. 2E, for example, if the change in the relative position between devices 102 and 140 is to change from a vertical direction to a horizontal direction.

In some demonstrative embodiments, transmitter 118 may transmit the one or more pilot signals via the updated beam directions. For example, transmitter 118 may transmit the one or more pilot signals via the one or more other beam directions 240 of FIG. 2B or 2E.

In some demonstrative embodiments, controller 124 may update the one or more other beam directions based on an adjustment of a beamwidth of beam direction 133. In one example, controller 124 may update the one or more other beam directions from a first plurality of beam directions including a first number of beam directions, e.g., corresponding to a first beamwidth, to a second plurality of beam directions including a second number of beam directions, greater than the first number, e.g., corresponding to a second beamwidth, lesser than the first beamwidth, e.g., as described below.

In one example, controller 124 may adjust the beamwidth of beam direction 133, for example, to account for a magnitude of the changes in the relative position between devices 102 and 140, e.g., as described below with reference to FIG. 4.

Figure 4:
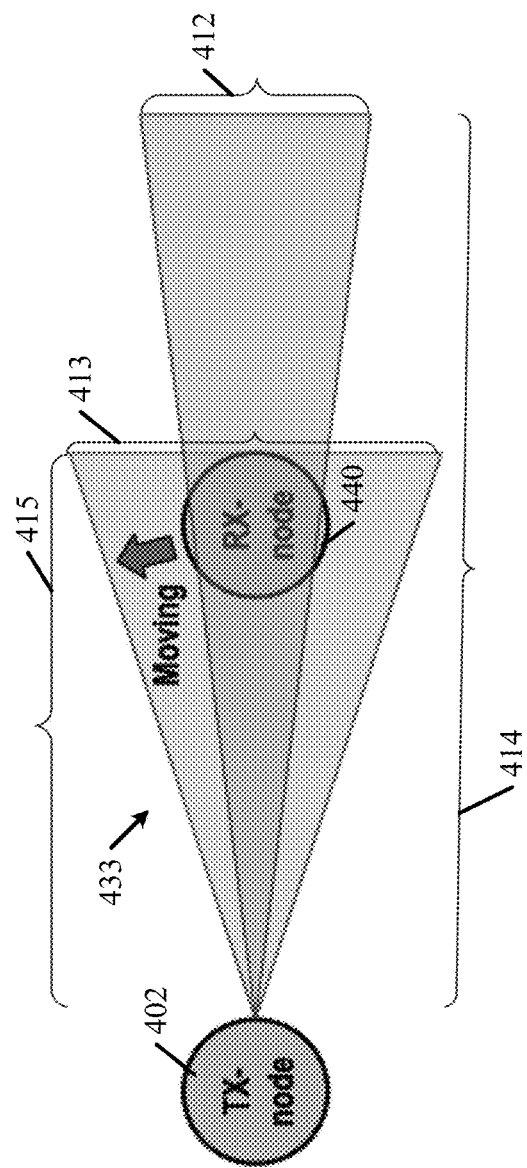
FIG. 4 is a schematic illustration of an adjustment of a beamwidth of a beam direction, in accordance with some demonstrative embodiments.

Reference is made to FIG. 4, which schematically illustrates an adjustment of a beamwidth of a beam direction 433 between a first wireless communication device 402 and a second wireless communication device 440, in accordance with some demonstrative embodiments. For example, beam direction 433 may perform the functionality of beam direction 133 (FIG. 1), beam direction 233 (FIG. 2) and/or beam direction 333 (FIG. 3), device 440 may perform the functionality of device 140 (FIG. 1) and/or device 402 may perform the functionality of device 102 (FIG. 1).

As shown in FIG. 4, beam direction 433 may have a first beamwidth 412 and a first beam range 414 to communicate with wireless communication device 440.

In some demonstrative embodiments, controller 124 (FIG. 1) may adjust, e.g., increase, the first beamwidth 412 to a second beam width 413.

As shown in FIG. 4, beam range 414 may be reduced to a second beam range 415, for example, as a result of increasing beamwidth 412 to beamwidth 413.

In some demonstrative embodiments, a Signal to Noise Ratio (SNR) of beam direction 433 having beamwidth 413 may be reduced, e.g., compared to an SNR of beam direction 433 with beamwidth 412.

In some demonstrative embodiments, controller 124 (FIG. 1) may adjust beamwidth 412 to beamwidth 413, for example, to account for often and/or large changes in the relative position between devices 102 and 140 (FIG. 1).

In some demonstrative embodiments, controller 124 (FIG. 1) may adjust beamwidth 412 to beamwidth 413 to reduce an number of switches from beam direction 433 to another beam direction, e.g., to account for often and/or large changes in the relative position between devices 102 and 140 (FIG. 1).

In some demonstrative embodiments, controller 124 (FIG. 1) may not adjust beamwidth 412 to beamwidth 413, for example, if the relative position between devices 440 and 402 remains static or changes slowly.

In some demonstrative embodiments, controller 124 (FIG. 1) may not adjust beamwidth 412 to beamwidth 413, if the relative position between devices 440 and 402 remains static or changes slowly, for example, to enable communicating between devices 402 and 440 using an increased SNR, e.g., as a result of beamwidth 412 being relatively narrow.

In some demonstrative embodiments, adjusting beam direction 433 to beamwidth 413, may reduce a probability of disconnection of communication between devices 402 and 440, e.g., when the relative position between devices 402 and 404 changes, for example, by reducing the SNR and increasing the beamwidth of beam direction 433.

Referring back to FIG. 1, in some demonstrative embodiments, controller 124 may determine a third beam direction 131 based on a second beamforming session.

In some demonstrative embodiments, controller 124 may perform the second beam training session, for example, when a quality of communication via beam direction 137 is below a predefined threshold.

In some demonstrative embodiments, controller 124 may perform the second beam training session periodically. For example, a beam training session may be performed every 200 milliseconds (ms) or any other interval, while the beam tracking may be performed every 10 ms or any other interval.

In another example, controller 124 may perform the second beam training session based on any other parameters and/or criterions, e.g., as described below.

In some demonstrative embodiments, controller 124 may perform the second beam training session based on a data flow between devices 102 and 140.

In some demonstrative embodiments, controller 124 may perform the second beam training session, for example, when little or no data is communicated between devices 102 and 140, e.g., between data transmissions.

In some demonstrative embodiments, controller 124 may use the beam tracking, e.g., as long as the quality of communication between devices 102 and 140 is above the predefined threshold.

In some demonstrative embodiments, controller 124 may use the beam tracking, e.g., even if the quality of communication between devices 102 and 140 is degraded, for example, as long as device 102 and/or 140 can communicate according to one or more requirements of device 102 and/or 140.

In some demonstrative embodiments, controller 124 may perform the second beam training session, for example, independent of the data flow, e.g., if the quality of communication does not comply with one or more requirements of device 102 and/or 140.

In some demonstrative embodiments, the beam tracking may be performed both by device 102 and device 140.

In some demonstrative embodiments, the beam tracking may be performed for uplink data flow, e.g., data transmission from device 102 to device 140, and/or for downlink data flow, e.g., data reception by device 102 from device 140.

In some demonstrative embodiments, the beam tracking may be independently applied to the uplink data flow and to the downlink data flow, for example, if devices 102 and 140 communicate according to the FDD scheme, e.g., since a channel status between the uplink data flow and the downlink data flow may be different in the FDD scheme.

In some demonstrative embodiments, the beam tracking may use channel reciprocity, for example, if devices 102 and 140 communicate according to the TDD scheme.

For example, the one or more pilot signals may be transmitted either by transmitter 118 or transmitter 148, e.g., using the uplink data flow or the downlink data flow.

In one example, the one or more pilot signals may be transmitted by transmitter 118. According to this example, when receiver 146 receives a pilot signal of the one or more pilot signals, which have a relatively better SNR, receiver 146 may adjust a beam direction of device 140, e.g., before or after transmitting feedback 149

In some demonstrative embodiments, using the beam tracking mechanism described herein may enable devices 102 and 140 to maintain the communication between devices 102 and/or 140 at a suitable quality and/or at a relatively high data rate, for example, while avoiding one or more beamforming sessions, and/or reducing a frequency of performing beam training sessions.

In some demonstrative embodiments, using the beam tracking mechanism may enable devices 102 and 140 to reduce a number of beam training sessions, and, as a result to increase a data rate of communication between devices 102 and/or 140.

In some demonstrative embodiments, using the beam tracking may enable devices 102 and 140 to reduce a number of disconnections of the communication between devices 102 and/or 140, for example, by combining the beamforming training sessions and the beam tracking, e.g., as described above.

Figure 5:
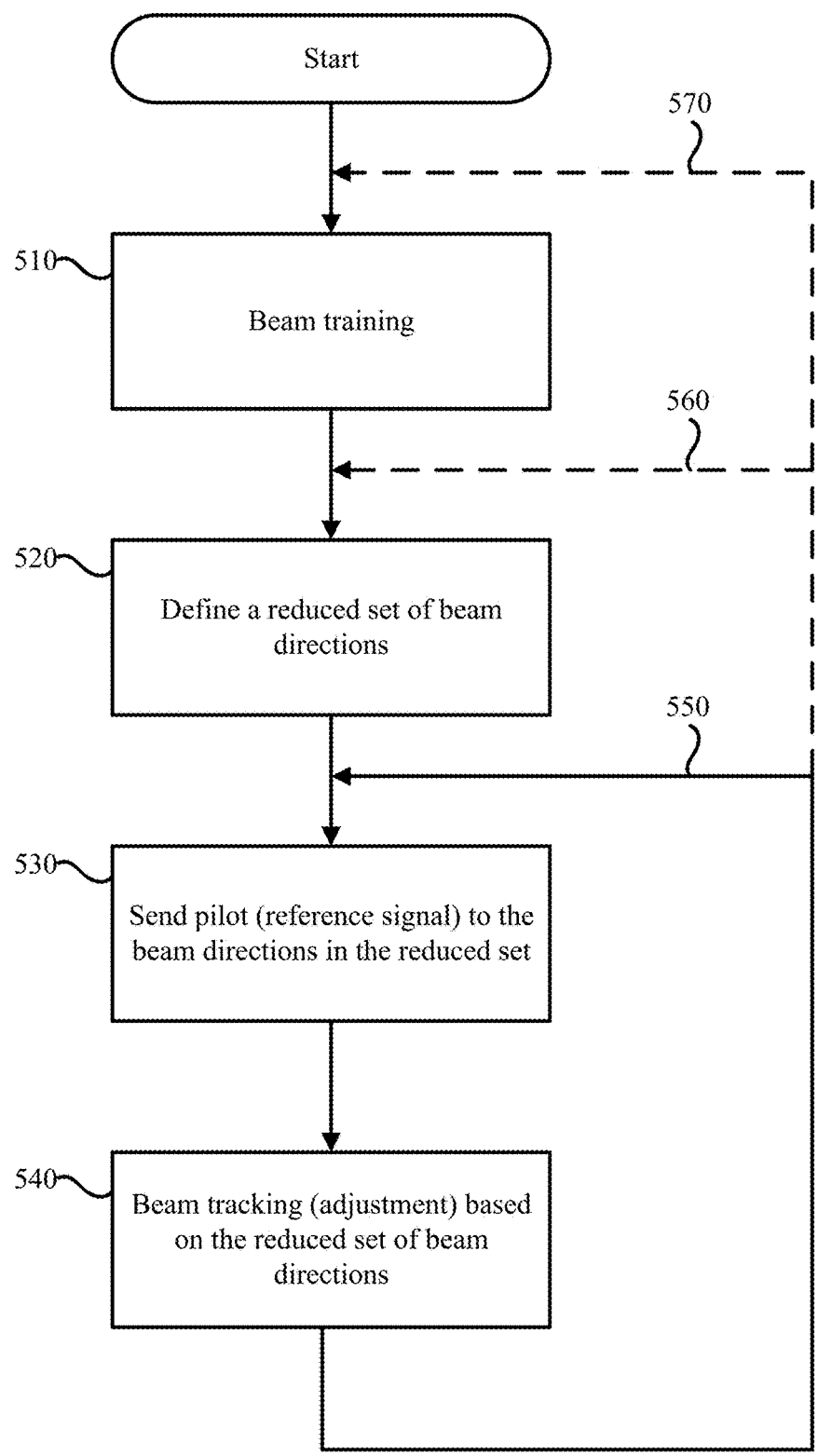
FIG. 5 is a flow-chart illustration of a method of beam tracking, in accordance with some demonstrative embodiments.

FIG. 5 is a flow-chart illustration of a method of beam tracking, in accordance with some demonstrative embodiments. One or more operations of the method of FIG. 5 may be performed, for example, by one or more elements of a system, e.g., system 100 (FIG. 1), a wireless communication device, e.g., device 102 (FIG. 1) and/or device 140 (FIG. 1), a transmitter, e.g., transmitter 118 and/or transmitter 148 (FIG. 1); a receiver, e.g., receiver 116 and/or receiver 146 (FIG. 1), and/or a controller, e.g., controller 124 and/or controller 154 (FIG. 1).

As indicated at block 510, the method may include performing a beamforming training session between a first wireless communication device and a second wireless communication device to determine a first beam direction. For example, device 102 and 140 (FIG. 1) may perform the first beamforming training session to determine beam direction 133 (FIG. 1), e.g., as described above.

As indicated at block 520, the method may include selecting one or more other beam directions. For example, controller 124 (FIG. 1) may select the one or more other beam directions, e.g., as described above.

As indicated at block 530, the method may include transmitting from the first wireless communication device one or more pilot signals via the one or more other beam directions, while communicating via the beam direction with the second wireless communication device. For example, transmitter 118 (FIG. 1) may transmit the one or more pilot signals via the one or more other beam directions, e.g., while communicating with device 140 via beam direction 133 (FIG. 1), e.g., as described above.

As indicated at block 540, the method may include tracking and/or adjusting the beam direction of the first wireless communication device using the one or more other beam directions. For example, controller 124 (FIG. 1) may track the beam direction of device 102 (FIG. 1) using the one or more other pilot signals, e.g., as described above.

As indicated by arrow 550, the method may include repeating the operations of block 530 and 540, for example, within a predefined period and/or based on any other criteria. For example, controller 124 (FIG. 1) may repeat the beamforming tracking periodically, e.g., as described above.

As indicated by arrow 560, the method may include redefining the one or more other beam directions. For example, controller 124 (FIG. 1) may update the one or more other beam directions 240 of FIG. 2A to the one or more other beam directions 240 of FIG. 2C.

As indicated by arrow 570, the method may include performing another beamforming training session, for example, if the first and/or second wireless communication devices fail to find the beam direction. For example, devices 102 and 140 (FIG. 1) may perform the second beamforming training session, for example, if the quality of communication via beam direction 137 (FIG. 1) is below the predefined threshold.

Figure 6:
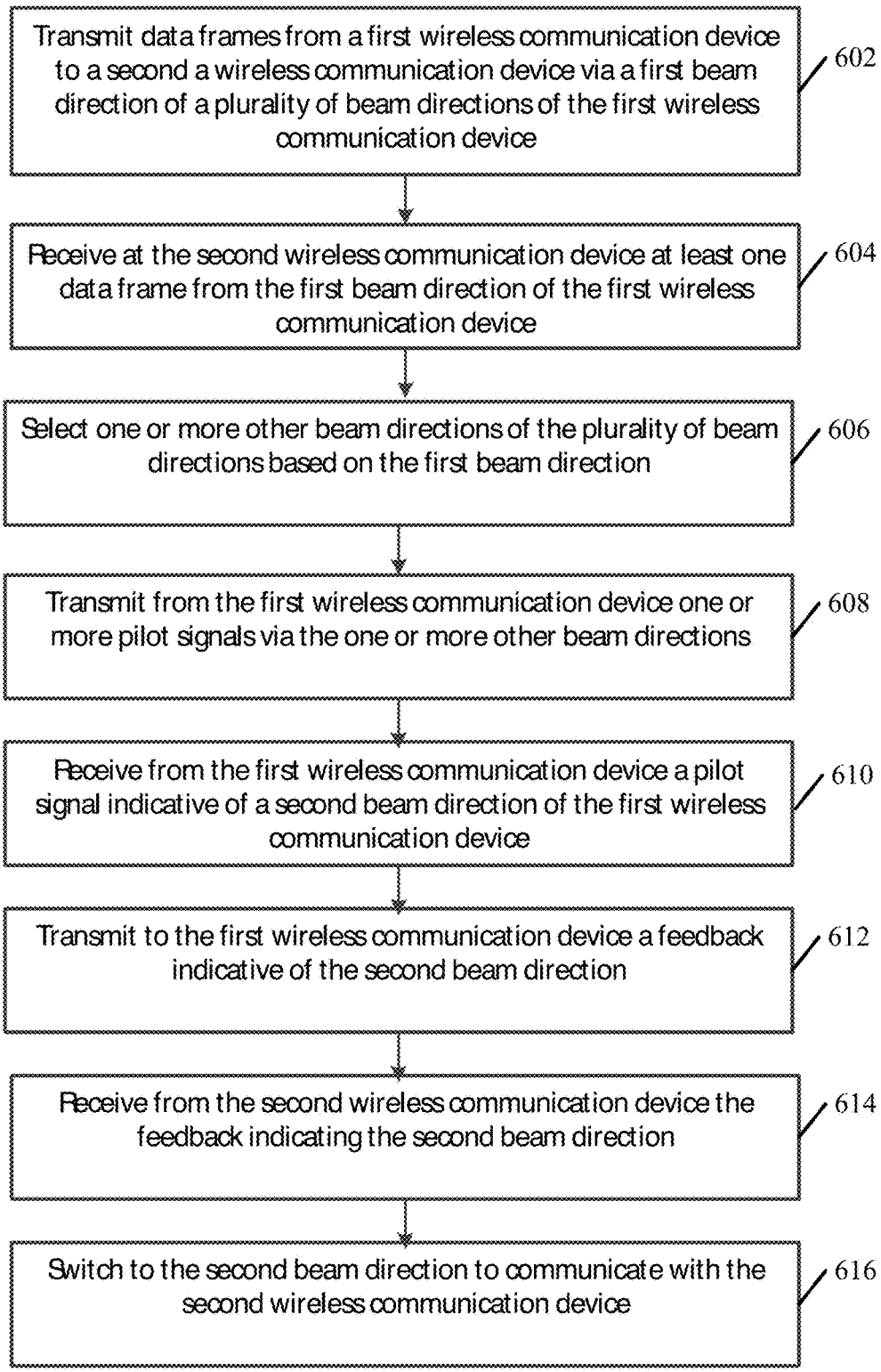
FIG. 6 is a flow-chart illustration of a method of beam tracking, in accordance with some demonstrative embodiments.

FIG. 6 is a flow-chart illustration of a method of beam tracking, in accordance with some demonstrative embodiments. One or more operations of the method of FIG. 6 may be performed, for example, by one or more elements of a system, e.g., system 100 (FIG. 1), a wireless communication device, e.g., device 102 (FIG. 1) and/or device 140 (FIG. 1), a transmitter, e.g., transmitter 118 and/or transmitter 148 (FIG. 1); a receiver, e.g., receiver 116 and/or receiver 146 (FIG. 1), and/or a controller, e.g., controller 124 and/or controller 154 (FIG. 1).

As indicated at block 602, the method may include transmitting data from a first wireless communication device to a second a wireless communication device via a first beam direction of a plurality of beam directions of the first wireless communication device. For example, transmitter 118 (FIG. 1) may transmit the data to device 140 (FIG. 1) via beam direction 133 (FIG. 1), e.g., as described above.

As indicated at block 604, the method may include receiving at least one data frame from the first beam direction of the first wireless communication device. For example, receiver 146 (FIG. 1) may receive from device 102 (FIG. 1) the at least one data frame from beam direction 133 (FIG. 1) of the plurality of beam directions 135 (FIG. 1), e.g., as described above.

As indicated at block 606, the method may include selecting one or more other beam directions of the plurality of beam directions based on the first beam direction. For example, controller 124 116 (FIG. 1) may select the one or more other beam directions 240 (FIGS. 2A-2E) based on beam direction 233 (FIGS. 2A-2E), e.g., as described above.

As indicated at block 608, the method may include transmitting from the first wireless communication device one or more pilot signals via the one or more other beam directions. For example, transmitter 118 (FIG. 1) may transmit the one or more pilot signals via the one or more other beam directions 240 (FIGS. 2A-2E), e.g., as described above.

As indicated at block 610, the method may include receiving from the first wireless communication device a pilot signal indicative of a second beam direction of the first wireless communication device. For example, receiver 146 (FIG. 1) may receive pilot signal 8 (FIG. 3) indicative of beam direction 137 (FIG. 1), e.g., as described above.

As indicated at block 612, the method may include transmitting to the first wireless communication device a feedback indicative of the second beam direction. For example, transmitter 148 (FIG. 1) may transmit feedback 149 indicative of beam direction 137 (FIG. 1), e.g., as described above.

As indicated at block 614, the method may include receiving from the second wireless communication device the feedback indicating the second beam direction. For example, receiver 116 (FIG. 1) may receiver feedback 149 indicative of beam direction 137 (FIG. 1), e.g., as described above.

As indicated at block 616, the method may include switching to the second beam direction to communicate with the second wireless communication device. For example, transmitter 118 (FIG. 1) may switch to beam direction 137 (FIG. 1) to communicate with device 140 (FIG. 1), e.g., as described above.

Figure 7:
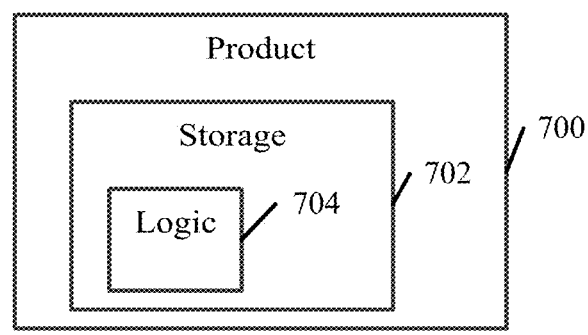
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 504, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), and/or to perform one or more operations of the method of FIGS. 5 and/or 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a transmitter to transmit data to a wireless communication device via a first beam direction of a plurality of beam directions, and to transmit one or more pilot signals via one or more other beam directions of the plurality of beam directions; and a receiver to receive from the wireless communication device a feedback indicating a second beam direction of the plurality of beam directions, the second beam direction being one of the one or more other beam directions, wherein the transmitter is to switch to the second beam direction to communicate with the wireless communication device.

Example 2 includes the subject matter of Example 1, and optionally, comprising a controller to select the one or more other beam directions based on the first beam direction.

Example 3 includes the subject matter of Example 2, and optionally, wherein the controller is to update the one or more other beam directions to include one or more updated beam directions, the transmitter is to transmit the one or more pilot signals via the updated beam directions.

Example 4 includes the subject matter of Example 3, and optionally, wherein the controller is to update the one or more other beam directions based on an adjustment of a beam-width of the first beam direction.

Example 5 includes the subject matter of any one of Examples 2-4, and optionally, wherein the controller is to determine the first beam direction according to a first beamforming training session, and to perform a second beamforming session, when a quality of communication via the second beam direction is below a predefined threshold.

Example 6 includes the subject matter of any one of Examples 1-5, and optionally, wherein the one or more other beam directions include one or more beam directions adjacent to the first beam direction.

Example 7 includes the subject matter of Example 6, and optionally, wherein the one or more other beam directions include two or more beam directions on a straight line through the first beam direction.

Example 8 includes the subject matter of any one of Examples 1-5, and optionally, wherein the one or more other beam directions surround the first beam direction.

Example 9 includes the subject matter of Example 8, and optionally, wherein the one or more other beam directions include a two-dimensional array of beam directions.

Example 10 includes the subject matter of any one of Examples 1-9, and optionally, wherein the one or more pilot signals comprise a plurality of pilot signals, the transmitter to transmit the plurality of pilot signals according to a time division multiplexing (TDM) scheme.

Example 11 includes the subject matter of Example 10, and optionally, wherein the transmitter is to transmit the plurality of pilot signals with a plurality of data frames.

Example 12 includes the subject matter of any one of Examples 1-9, and optionally, wherein the one or more pilot signals comprise a plurality of pilot signals, the transmitter to transmit the plurality of pilot signals according to a frequency division multiplexing (FDM) scheme.

Example 13 includes the subject matter of Example 12, and optionally, wherein the transmitter is to simultaneously transmit the plurality of pilot signals over a plurality of different subcarriers.

Example 14 includes the subject matter of any one of Examples 1-13, and optionally, wherein the transmitter is to periodically repeat the transmission of the one or more pilot signals.

Example 15 includes the subject matter of any one of Examples 1-14, and optionally, wherein the first and second beam directions comprise first and second millimeter wave beam directions.

Example 16 includes an apparatus comprising a receiver to receive at least one data frame from a first transmit (Tx)

beam direction of a wireless communication device, and to receive a pilot signal indicative of a second Tx beam direction of the wireless communication device; and a transmitter to transmit to the wireless communication device a feedback indicative of the second Tx beam direction.

Example 17 includes the subject matter of Example 16, and optionally, comprising a controller to communicate with the wireless communication device a message including one or more Tx beam directions, the second beam direction being one of the one or more Tx beam directions.

Example 18 includes the subject matter of Example 17, and optionally, wherein the transmitter is to transmit the message to the wireless communication device.

Example 19 includes the subject matter of Example 17, and optionally, wherein the receiver is to receive the message from the wireless communication device.

Example 20 includes the subject matter of any one of Examples 17-19, and optionally, wherein the one or more Tx beam directions include one or more beam directions adjacent to the first Tx beam direction.

Example 21 includes the subject matter of Example 20, and optionally, wherein the one or more Tx beam directions include two or more beam directions on a straight line through the first Tx beam direction.

Example 22 includes the subject matter of any one of Examples 17-19, and optionally, wherein the one or more Tx beam directions surround the first Tx beam direction.

Example 23 includes the subject matter of Example 22, and optionally, wherein the one or more Tx beam directions include a two dimensional array of beam directions.

Example 24 includes the subject matter of any one of Examples 16-23, and optionally, wherein the first Tx beam direction is determined according to a beamforming training session.

Example 25 includes the subject matter of any one of Examples 16-24, and optionally, wherein, subsequent to transmission of the feedback, the receiver is to receive another data frame from the second Tx beam direction.

Example 26 includes the subject matter of any one of Examples 16-25, and optionally, wherein the first and second Tx beam directions comprise first and second millimeter wave beam directions.

Example 27 includes a method comprising transmitting data to a wireless communication device via a first beam direction of a plurality of beam directions; transmitting one or more pilot signals via one or more other beam directions of the plurality of beam directions; receiving from the wireless communication device a feedback indicating a second beam direction of the plurality of beam directions, the second beam direction being one of the one or more other beam directions; and switching to the second beam direction to communicate with the wireless communication device.

Example 28 includes the subject matter of Example 27, and optionally, comprising selecting the one or more other beam directions based on the first beam direction.

Example 29 includes the subject matter of Example 28, and optionally, comprising updating the one or more other beam directions to include one or more updated beam directions, and transmitting the one or more pilot signals via the updated beam directions.

Example 30 includes the subject matter of Example 29, and optionally, comprising updating the one or more other beam directions based on an adjustment of a beam-width of the first beam direction.

Example 31 includes the subject matter of any one of Examples 28-30, and optionally, comprising determining the first beam direction according to a first beamforming training session, and performing a second beamforming session, when a quality of communication via the second beam direction is below a predefined threshold.

Example 32 includes the subject matter of any one of Examples 27-31, and optionally, wherein the one or more other beam directions include one or more beam directions adjacent to the first beam direction.

Example 33 includes the subject matter of Example 32, and optionally, wherein the one or more other beam directions include two or more beam directions on a straight line through the first beam direction.

Example 34 includes the subject matter of any one of Examples 27-31, and optionally, wherein the one or more other beam directions surround the first beam direction.

Example 35 includes the subject matter of Example 34, and optionally, wherein the one or more other beam directions include a two-dimensional array of beam directions.

Example 36 includes the subject matter of any one of Examples 27-35, and optionally, wherein the one or more pilot signals comprise a plurality of pilot signals, the method comprising transmitting the plurality of pilot signals according to a time division multiplexing (TDM) scheme.

Example 37 includes the subject matter of Example 36, and optionally, comprising transmitting the plurality of pilot signals with a plurality of data frames.

Example 38 includes the subject matter of any one of Examples 27-35, and optionally, wherein the one or more pilot signals comprise a plurality of pilot signals, the method comprising transmitting the plurality of pilot signals according to a frequency division multiplexing (FDM) scheme.

Example 39 includes the subject matter of Example 38, and optionally, comprising simultaneously transmitting the plurality of pilot signals over a plurality of different subcarriers.

Example 40 includes the subject matter of any one of Examples 27-39, and optionally, comprising periodically repeating the transmission of the one or more pilot signals.

Example 41 includes the subject matter of any one of Examples 27-40, and optionally, wherein the first and second beam directions comprise first and second millimeter wave beam directions.

Example 42 includes a method comprising receiving at least one data frame from a first transmit (Tx) beam direction of a wireless communication device; receiving a pilot signal indicative of a second Tx beam direction of the wireless communication device; and transmitting to the wireless communication device a feedback indicative of the second Tx beam direction.

Example 43 includes the subject matter of Example 42, and optionally, comprising communicating with the wireless communication device a message including one or more Tx beam directions, the second beam direction being one of the one or more Tx beam directions.

Example 44 includes the subject matter of Example 43, and optionally, comprising transmitting the message to the wireless communication device.

Example 45 includes the subject matter of Example 43, and optionally, comprising receiving the message from the wireless communication device.

Example 46 includes the subject matter of any one of Examples 43-45, and optionally, wherein the one or more Tx beam directions include one or more beam directions adjacent to the first Tx beam direction.

Example 47 includes the subject matter of Example 46, and optionally, wherein the one or more Tx beam directions include two or more beam directions on a straight line through the first Tx beam direction.

Example 48 includes the subject matter of any one of Examples 43-45, and optionally, wherein the one or more Tx beam directions surround the first Tx beam direction.

Example 49 includes the subject matter of Example 48, and optionally, wherein the one or more Tx beam directions include a two dimensional array of beam directions.

Example 50 includes the subject matter of any one of Examples 42-49, and optionally, wherein the first Tx beam direction is determined according to a beamforming training session.

Example 51 includes the subject matter of any one of Examples 42-50, and optionally, comprising, subsequent to transmission of the feedback, receiving another data frame from the second Tx beam direction.

Example 52 includes the subject matter of any one of Examples 42-51, and optionally, wherein the first and second Tx beam directions comprise first and second millimeter wave beam directions.

Example 53 includes a wireless communication system comprising one or more antennas; a processor; a memory; a transmitter to transmit data to a wireless communication device via a first beam direction of a plurality of beam directions, and to transmit one or more pilot signals via one or more other beam directions of the plurality of beam directions; and a receiver to receive from the wireless communication device a feedback indicating a second beam direction of the plurality of beam directions, the second beam direction being one of the one or more other beam directions, wherein the transmitter is to switch to the second beam direction to communicate with the wireless communication device.

Example 54 includes the subject matter of Example 53, and optionally, comprising a controller to select the one or more other beam directions based on the first beam direction.

Example 55 includes the subject matter of Example 54, and optionally, wherein the controller is to update the one or more other beam directions to include one or more updated beam directions, the transmitter is to transmit the one or more pilot signals via the updated beam directions.

Example 56 includes the subject matter of Example 55, and optionally, wherein the controller is to update the one or more other beam directions based on an adjustment of a beam-width of the first beam direction.

Example 57 includes the subject matter of any one of Examples 54-56, and optionally, wherein the controller is to determine the first beam direction according to a first beamforming training session, and to perform a second beamforming session, when a quality of communication via the second beam direction is below a predefined threshold.

Example 58 includes the subject matter of any one of Examples 53-57, and optionally, wherein the one or more other beam directions include one or more beam directions adjacent to the first beam direction.

Example 59 includes the subject matter of Example 58, and optionally, wherein the one or more other beam directions include two or more beam directions on a straight line through the first beam direction.

Example 60 includes the subject matter of any one of Examples 53-57, and optionally, wherein the one or more other beam directions surround the first beam direction.

Example 61 includes the subject matter of Example 60, and optionally, wherein the one or more other beam directions include a two-dimensional array of beam directions.

Example 62 includes the subject matter of any one of Examples 53-61, and optionally, wherein the one or more pilot signals comprise a plurality of pilot signals, the transmitter to transmit the plurality of pilot signals according to a time division multiplexing (TDM) scheme.

Example 63 includes the subject matter of Example 62, and optionally, wherein the transmitter is to transmit the plurality of pilot signals with a plurality of data frames.

Example 64 includes the subject matter of any one of Examples 53-61, and optionally, wherein the one or more pilot signals comprise a plurality of pilot signals, the transmitter to transmit the plurality of pilot signals according to a frequency division multiplexing (FDM) scheme.

Example 65 includes the subject matter of Example 64, and optionally, wherein the transmitter is to simultaneously transmit the plurality of pilot signals over a plurality of different subcarriers.

Example 66 includes the subject matter of any one of Examples 53-65, and optionally, wherein the transmitter is to periodically repeat the transmission of the one or more pilot signals.

Example 67 includes the subject matter of any one of Examples 53-66, and optionally, wherein the first and second beam directions comprise first and second millimeter wave beam directions.

Example 68 includes a wireless communication system comprising one or more antennas; a processor; a memory; a receiver to receive at least one data frame from a first transmit (Tx) beam direction of a wireless communication device, and to receive a pilot signal indicative of a second Tx beam direction of the wireless communication device; and a transmitter to transmit to the wireless communication device a feedback indicative of the second Tx beam direction.

Example 69 includes the subject matter of Example 68, and optionally, comprising a controller to communicate with the wireless communication device a message including one or more Tx beam directions, the second beam direction being one of the one or more Tx beam directions.

Example 70 includes the subject matter of Example 69, and optionally, wherein the transmitter is to transmit the message to the wireless communication device.

Example 71 includes the subject matter of Example 69, and optionally, wherein the receiver is to receive the message from the wireless communication device.

Example 72 includes the subject matter of any one of Examples 69-71, and optionally, wherein the one or more Tx beam directions include one or more beam directions adjacent to the first Tx beam direction.

Example 73 includes the subject matter of Example 72, and optionally, wherein the one or more Tx beam directions include two or more beam directions on a straight line through the first Tx beam direction.

Example 74 includes the subject matter of any one of Examples 69-71, and optionally, wherein the one or more Tx beam directions surround the first Tx beam direction.

Example 75 includes the subject matter of Example 74, and optionally, wherein the one or more Tx beam directions include a two dimensional array of beam directions.

Example 76 includes the subject matter of any one of Examples 68-75, and optionally, wherein the first Tx beam direction is determined according to a beamforming training session.

Example 77 includes the subject matter of any one of Examples 68-76, and optionally, wherein, subsequent to transmission of the feedback, the receiver is to receive another data frame from the second Tx beam direction.

Example 78 includes the subject matter of any one of Examples 68-77, and optionally, wherein the first and second Tx beam directions comprise first and second millimeter wave beam directions.

Example 79 includes a product including one or more tangible computer-readable non-transitory storage media comprising computer-executable instructions operable to, when executed by at least one computer processor, enable the at least one computer processor to implement a method comprising transmitting data to a wireless communication device via a first beam direction of a plurality of beam directions; transmitting one or more pilot signals via one or more other beam directions of the plurality of beam directions; receiving from the wireless communication device a feedback indicating a second beam direction of the plurality of beam directions, the second beam direction being one of the one or more other beam directions; and switching to the second beam direction to communicate with the wireless communication device.

Example 80 includes the subject matter of Example 79, and optionally, wherein the method comprises selecting the one or more other beam directions based on the first beam direction.

Example 81 includes the subject matter of Example 80, and optionally, wherein the method comprises updating the one or more other beam directions to include one or more updated beam directions, and transmitting the one or more pilot signals via the updated beam directions.

Example 82 includes the subject matter of Example 81, and optionally, wherein the method comprises updating the one or more other beam directions based on an adjustment of a beam-width of the first beam direction.

Example 83 includes the subject matter of any one of Examples 80-82, and optionally, wherein the method comprises determining the first beam direction according to a first beamforming training session, and performing a second beamforming session, when a quality of communication via the second beam direction is below a predefined threshold.

Example 84 includes the subject matter of any one of Examples 79-83, and optionally, wherein the one or more other beam directions include one or more beam directions adjacent to the first beam direction.

Example 85 includes the subject matter of Example 84, and optionally, wherein the one or more other beam directions include two or more beam directions on a straight line through the first beam direction.

Example 86 includes the subject matter of any one of Examples 79-83, and optionally, wherein the one or more other beam directions surround the first beam direction.

Example 87 includes the subject matter of Example 86, and optionally, wherein the one or more other beam directions include a two-dimensional array of beam directions.

Example 88 includes the subject matter of any one of Examples 79-87, and optionally, wherein the one or more pilot signals comprise a plurality of pilot signals, the method comprises transmitting the plurality of pilot signals according to a time division multiplexing (TDM) scheme.

Example 89 includes the subject matter of Example 88, and optionally, wherein the method comprises transmitting the plurality of pilot signals with a plurality of data frames.

Example 90 includes the subject matter of any one of Examples 79-87, and optionally, wherein the one or more pilot signals comprise a plurality of pilot signals, the method comprises transmitting the plurality of pilot signals according to a frequency division multiplexing (FDM) scheme.

Example 91 includes the subject matter of Example 90, and optionally, wherein the method comprises simultaneously transmitting the plurality of pilot signals over a plurality of different subcarriers.

Example 92 includes the subject matter of any one of Examples 79-91, and optionally, wherein the method comprises periodically repeating the transmission of the one or more pilot signals.

Example 93 includes the subject matter of any one of Examples 79-92, and optionally, wherein the first and second beam directions comprise first and second millimeter wave beam directions.

Example 94 includes a product including one or more tangible computer-readable non-transitory storage media comprising computer-executable instructions operable to, when executed by at least one computer processor, enable the at least one computer processor to implement a method comprising receiving at least one data frame from a first transmit (Tx) beam direction of a wireless communication device; receiving a pilot signal indicative of a second Tx beam direction of the wireless communication device; and transmitting to the wireless communication device a feedback indicative of the second Tx beam direction.

Example 95 includes the subject matter of Example 94, and optionally, wherein the method comprises communicating with the wireless communication device a message including one or more Tx beam directions, the second beam direction being one of the one or more Tx beam directions.

Example 96 includes the subject matter of Example 95, and optionally, wherein the method comprises transmitting the message to the wireless communication device.

Example 97 includes the subject matter of Example 95, and optionally, wherein the method comprises receiving the message from the wireless communication device.

Example 98 includes the subject matter of any one of Examples 95-97, and optionally, wherein the one or more Tx beam directions include one or more beam directions adjacent to the first Tx beam direction.

Example 99 includes the subject matter of Example 98, and optionally, wherein the one or more Tx beam directions include two or more beam directions on a straight line through the first Tx beam direction.

Example 100 includes the subject matter of any one of Examples 95-97, and optionally, wherein the one or more Tx beam directions surround the first Tx beam direction.

Example 101 includes the subject matter of Example 100, and optionally, wherein the one or more Tx beam directions include a two dimensional array of beam directions.

Example 102 includes the subject matter of any one of Examples 94-101, and optionally, wherein the first Tx beam direction is determined according to a beamforming training session.

Example 103 includes the subject matter of any one of Examples 94-102, and optionally, wherein the method comprises, subsequent to transmission of the feedback, receiving another data frame from the second Tx beam direction.

Example 104 includes the subject matter of any one of Examples 94-103, and optionally, wherein the first and second Tx beam directions comprise first and second millimeter wave beam directions.

Example 105 includes an apparatus comprising means for transmitting data to a wireless communication device via a first beam direction of a plurality of beam directions; means for transmitting one or more pilot signals via one or more other beam directions of the plurality of beam directions; means for receiving from the wireless communication device a feedback indicating a second beam direction of the plurality of beam directions, the second beam direction being one of the one or more other beam directions; and means for switching to the second beam direction to communicate with the wireless communication device.

Example 106 includes the subject matter of Example 105, and optionally, comprising means for selecting the one or more other beam directions based on the first beam direction.

Example 107 includes the subject matter of Example 106, and optionally, comprising means for updating the one or more other beam directions to include one or more updated beam directions, and means for transmitting the one or more pilot signals via the updated beam directions.

Example 108 includes the subject matter of Example 107, and optionally, comprising means for updating the one or more other beam directions based on an adjustment of a beam-width of the first beam direction.

Example 109 includes the subject matter of any one of Examples 106-108, and optionally, comprising means for determining the first beam direction according to a first beamforming training session, and performing a second beamforming session, when a quality of communication via the second beam direction is below a predefined threshold.

Example 110 includes the subject matter of any one of Examples 105-109, and optionally, wherein the one or more other beam directions include one or more beam directions adjacent to the first beam direction.

Example 111 includes the subject matter of Example 110, and optionally, wherein the one or more other beam directions include two or more beam directions on a straight line through the first beam direction.

Example 112 includes the subject matter of any one of Examples 105-109, and optionally, wherein the one or more other beam directions surround the first beam direction.

Example 113 includes the subject matter of Example 112, and optionally, wherein the one or more other beam directions include a two-dimensional array of beam directions.

Example 114 includes the subject matter of any one of Examples 105-113, and optionally, wherein the one or more pilot signals comprise a plurality of pilot signals, the apparatus comprising means for transmitting the plurality of pilot signals according to a time division multiplexing (TDM) scheme.

Example 115 includes the subject matter of Example 114, and optionally, comprising means for transmitting the plurality of pilot signals with a plurality of data frames.

Example 116 includes the subject matter of any one of Examples 105-113, and optionally, wherein the one or more pilot signals comprise a plurality of pilot signals, the apparatus comprising means for transmitting the plurality of pilot signals according to a frequency division multiplexing (FDM) scheme.

Example 117 includes the subject matter of Example 116, and optionally, comprising means for simultaneously transmitting the plurality of pilot signals over a plurality of different subcarriers.

Example 118 includes the subject matter of any one of Examples 105-117, and optionally, comprising means for periodically repeating the transmission of the one or more pilot signals.

Example 119 includes the subject matter of any one of Examples 105-118, and optionally, wherein the first and second beam directions comprise first and second millimeter wave beam directions.

Example 120 includes an apparatus comprising means for receiving at least one data frame from a first transmit (Tx) beam direction of a wireless communication device; means for receiving a pilot signal indicative of a second Tx beam direction of the wireless communication device; and means for transmitting to the wireless communication device a feedback indicative of the second Tx beam direction.

Example 121 includes the subject matter of Example 120, and optionally, comprising means for communicating with the wireless communication device a message including one or more Tx beam directions, the second beam direction being one of the one or more Tx beam directions.

Example 122 includes the subject matter of Example 121, and optionally, comprising means for transmitting the message to the wireless communication device.

Example 123 includes the subject matter of Example 121, and optionally, comprising means for receiving the message from the wireless communication device.

Example 124 includes the subject matter of any one of Examples 121-123, and optionally, wherein the one or more Tx beam directions include one or more beam directions adjacent to the first Tx beam direction.

Example 125 includes the subject matter of Example 124, and optionally, wherein the one or more Tx beam directions include two or more beam directions on a straight line through the first Tx beam direction.

Example 126 includes the subject matter of any one of Examples 121-123, and optionally, wherein the one or more Tx beam directions surround the first Tx beam direction.

Example 127 includes the subject matter of Example 126, and optionally, wherein the one or more Tx beam directions include a two dimensional array of beam directions.

Example 128 includes the subject matter of any one of Examples 120-127, and optionally, wherein the first Tx beam direction is determined according to a beamforming training session.

Example 129 includes the subject matter of any one of Examples 120-128, and optionally, comprising means for, subsequent to transmission of the feedback, receiving another data frame from the second Tx beam direction.

Example 130 includes the subject matter of any one of Examples 120-129, and optionally, wherein the first and second Tx beam directions comprise first and second millimeter wave beam directions.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:
1. An apparatus comprising:
a transmitter to transmit data to a wireless communication device via a first beam direction of a plurality of beam directions, and to transmit, during transmission of the data, one or more pilot signals via one or more other beam directions of said plurality of beam directions; and
a receiver to receive from said wireless communication device a feedback indicating a change, during the transmission of the data via the first beam direction, in a directionality of the wireless communication device from the first beam direction to a second beam direction of said plurality of beam directions, the feedback is to identify that said second beam direction is to include a pilot beam direction of said one or more other beam directions of the one or more pilot signals, wherein said transmitter is to track the change in the directionality of the wireless communication device based on the pilot beam direction identified by the feedback by switching from the first beam direction to said second beam direction to communicate with said wireless communication device.

2. The apparatus of claim 1 comprising a controller to select said one or more other beam directions based on said first beam direction.

3. The apparatus of claim 2, wherein said controller is to update said one or more other beam directions to include one or more updated beam directions, said transmitter is to transmit said one or more pilot signals via said updated beam directions.

4. The apparatus of claim 3, wherein said controller is to update the one or more other beam directions based on an adjustment of a beam-width of the first beam direction.

5. The apparatus of claim 2, wherein said controller is to determine the first beam direction according to a first beamforming training session, and to perform a second beamforming training session, when a quality of communication via said second beam direction is below a predefined threshold.

6. The apparatus of claim 1, wherein said one or more other beam directions include one or more beam directions adjacent to said first beam direction.

7. The apparatus of claim 6, wherein said one or more other beam directions include two or more beam directions on a straight line through said first beam direction.

8. The apparatus of claim 1, wherein said one or more other beam directions surround said first beam direction.

9. The apparatus of claim 1, wherein said one or more pilot signals comprise a plurality of pilot signals, said transmitter to transmit said plurality of pilot signals according to a time division multiplexing (TDM) scheme.

10. The apparatus of claim 9, wherein said transmitter is to transmit said plurality of pilot signals with a plurality of data frames.

11. The apparatus of claim 1, wherein said one or more pilot signals comprise a plurality of pilot signals, said transmitter to transmit said plurality of pilot signals according to a frequency division multiplexing (FDM) scheme.

12. The apparatus of claim 11, wherein said transmitter is to simultaneously transmit said plurality of pilot signals over a plurality of different subcarriers.

13. The apparatus of claim 1, wherein said transmitter is to periodically repeat the transmission of said one or more pilot signals.

14. The apparatus of claim 1, wherein said first and second beam directions comprise first and second millimeter wave beam directions.

15. An apparatus comprising:
a receiver to receive at least one data frame of a data transmission from a first transmit (Tx) beam direction of a wireless communication device, and to receive, during the data transmission, a pilot signal indicative of a second Tx beam direction of said wireless communication device; and
a transmitter to transmit to said wireless communication device a feedback based on the pilot signal received during the data transmission, the feedback indicating a change, during the data transmission, in a relative directionality of the wireless communication device from the first Tx beam direction to said second Tx beam direction, wherein, subsequent to transmission of said feedback, said receiver is to receive another data frame of the data transmission from the second Tx beam direction.

16. The apparatus of claim 15 comprising a controller to communicate with said wireless communication device a message including one or more Tx beam directions, said second beam direction being one of said one or more Tx beam directions.

17. The apparatus of claim 16, wherein said one or more Tx beam directions include one or more beam directions adjacent to said first Tx beam direction.

18. The apparatus of claim 15, wherein said first Tx beam direction is determined according to a beamforming training session.

19. The apparatus of claim 18, wherein said receiver is to receive the another data frame of the data transmission from the second Tx beam direction without performing another beamforming training session.

20. A product including one or more non-transitory tangible computer-readable storage media comprising computer-executable instructions operable to, when executed by at least one computer processor, enable the at least one computer processor to implement operations comprising:
transmitting data to a wireless communication device via a first beam direction of a plurality of beam directions;
during transmission of the data, transmitting one or more pilot signals via one or more other beam directions of said plurality of beam directions;
receiving from said wireless communication device a feedback indicating a change, during the transmission of the data via the first beam direction, in a directionality of the wireless communication device from the first beam direction to a second beam direction of said plurality of beam directions, the feedback is to identify that said second beam direction is to include a pilot beam direction of said one or more other beam directions of the one or more pilot signals; and
tracking the change in the directionality of the wireless communication device based on the pilot beam direction identified by the feedback by switching to said second beam direction to communicate with said wireless communication device.

21. The product of claim 20, wherein said operations comprise selecting said one or more other beam directions based on said first beam direction.

22. The product of claim 20, wherein said operations comprise updating said one or more other beam directions to include one or more updated beam directions, and transmitting said one or more pilot signals via said updated beam directions.

23. A product including one or more non-transitory tangible computer-readable storage media comprising computer-executable instructions operable to, when executed by at least one computer processor, enable the at least one computer processor to implement operations comprising:
receiving at least one data frame of a data transmission from a first transmit (Tx) beam direction of a wireless communication device;
receiving, during the data transmission, a pilot signal indicative of a second Tx beam direction of said wireless communication device;
transmitting to said wireless communication device a feedback based on the pilot signal received during the data transmission, the feedback indicating a change, during the data transmission, in a relative directionality of the wireless communication device from the first Tx beam direction to said second Tx beam direction, and subsequent to transmission of said feedback, receiving another data frame of the data transmission from the second Tx beam direction.

24. The product of claim 23, wherein said operations comprise communicating with said wireless communication device a message including one or more Tx beam directions, said second beam direction being one of said one or more Tx beam directions.

25. The product of claim 23, wherein said operations comprise determining said first Tx beam direction according to a beamforming training session, and receiving the another data frame of the data transmission from the second Tx beam direction without performing another beamforming training session.

\* \* \* \* \*